United States Patent [19]

Suzuki et al.

[11] Patent Number: 4,681,182

[45] Date of Patent: Jul. 21, 1987

[54] ELECTRIC POWER STEERING APPARATUS

[75] Inventors: Yoshio Suzuki; Takeshi Ohe; Ichiro Koike, all of Saitama, Japan

[73] Assignee: Jidosha Kiki Co., Ltd., Tokyo, Japan

[21] Appl. No.: 839,684

[22] Filed: Mar. 14, 1986

[30] Foreign Application Priority Data

| Apr. 11, 1985 | [JP] | Japan | 60-77449 |
| Apr. 19, 1985 | [JP] | Japan | 60-82140 |
| Apr. 19, 1985 | [JP] | Japan | 60-82141 |
| Apr. 19, 1985 | [JP] | Japan | 60-82142 |

[51] Int. Cl.$^4$ .............................................. B62D 5/04
[52] U.S. Cl. .................................................. 180/79.1
[58] Field of Search ................ 180/79, 79.1, 132, 141, 180/142, 146, 147, 148

[56] References Cited

U.S. PATENT DOCUMENTS

| 4,448,275 | 5/1984 | Kitagawa | 180/142 |
| 4,577,716 | 3/1986 | Norton | 180/79.1 |
| 4,621,701 | 11/1986 | Takabayashi | 180/79.1 |

FOREIGN PATENT DOCUMENTS

| 3240629 | 5/1984 | Fed. Rep. of Germany | 180/141 |
| 2478004 | 9/1981 | France | 180/79.1 |
| 47251 | 3/1982 | Japan | 180/79.1 |
| 1395954 | 5/1975 | United Kingdom | 180/79.1 |

Primary Examiner—John J. Love
Assistant Examiner—Everett G. Diederiks, Jr.
Attorney, Agent, or Firm—Blakely, Sokoloff, Taylor & Zafman

[57] ABSTRACT

An electric power steering apparatus comprises a steering shaft including a torsion bar to join an input shaft on the side of a steering wheel and an output shaft on the side of a steering road wheel so that they can be rotationally displaced relative to each other, and a non-contact type sensor using a Hall effect device provided in association with the input and output shafts to sense a relative rotational displacement based on a torsion of the torsion bar. The electric power steering apparatus further comprises an electric motor provided around a steering gear body within which the steering shaft is disposed and is driven by a signal from the non-contact type sensor to render a steering assistance to an output shafting leading to the steering road wheel. Thus, this can provide a power steering apparatus of simple and inexpensive structure to prevent that the reliability is lowered when used for a long timer or subject to environment changes, thus eliminating the troublesomeness in the adjustment work therefor. Further, this novel apparatus utilizes the sense function of the non-contact type sensor, thereby making it possible to provide a proper and smooth steering assistance effort conforming to running conditions of a vehicle, resulting in high performance of the power steering apparatus.

5 Claims, 6 Drawing Figures

ELECTRIC POWER STEERING APPARATUS

BACKGROUND OF THE INVENTION

The present invention relates to an electric power steering apparatus used for lessening an operational force (steering force) of a steering wheel, and more particularly to an improvement in an electric power steering apparatus wherein an electric motor in used as means for producing a steering assistance effort.

Steering apparatus generally called "power steering arrangement" have been widely embarked on various kinds of vehicles etc. including compact cars in recent years. Such power steering apparatus lessen a steering force of a driver to enable a simple and nimble steering operation and can exhibit their effect in lessening fatigue etc. of the driver. In general, oil pressure type power steering apparatus have been used in the art as apparatus of this kind. Recently, various electric type power steering apparatus utilizing an electric motor etc. without making use of oil pressure have been proposed.

The drawbacks with the first-mentioned oil pressure type power steering apparatus are as follows. They require not only an oil pressure cylinder for generating a steering assistance but also an oil pressure pump, a flow path switch valve, and oil pressure piping system etc. connecting these parts to each other, resulting in a large number of parts. Further, the employment of such apparatus results in not only complicated structure in each part and difficulty and troublesomeness in manufacturing and assembling work, but also large-sized apparatus in the entirely and increased weight.

To overcome these problems, there have been recently employed various kinds of electric power steering apparatus in which an electric motor which can be used by connecting it to a battery embarked on a vehicle and a controller with a simple electric wiring is used as means for generating a steering assistance. Such electric power steering arrangement make it possible to simplify the configuration of each part of the apparatus and to make the entirely of the apparatus small and compact.

However, in order to realize a power steering apparatus using the above-mentioned electric motor as means for generating a steering assistance, there arise various problems in respect of motor control and response etc. Accordingly, such electric power steering apparatus have been beyond realization for the present time.

It is essential for realization of the above-mentioned electric power steering apparatus to simply and properly detect various kinds of running conditions e.g. a steering force or a steering angle at maneuvering conforming to a steering operation of a driver and a running speed etc. of a vehicle to suitably control and drive an electric motor in response to the value detected, thus providing a necessary steering assistance.

Particularly, vehicles on which a power steering apparatus of this kind is embarked are required so that they can output a large steering assistance in order to produce an extremely light steering operational force in the case of carrying out a steering operation when a vehicle is stopped, i.e., steering with the wheel being laid on ground or a steering operation when a vehicle runs at a low speed. When the electric power steering apparatus are used in such a case, they can exhibit their effect. However, on the other hand, where a vehicle runs at a high speed, if a large steering assistance effort is caused to be produced at the time when a vehicle runs at a low speed as previously mentioned or the like, an operating force of a steering wheel is too light, resulting in the problem that uneasiness of a driver is urged. This is not desirable in an attainment of an appropriate driving sense from a practical point of view. Conversely, it is required to provide a structure which allows steering assistance to be reduced to apply a relatively large weight to the steering wheel, i.e., to increase a steering force.

To meet such a requirement, it is required to drive the above-mentioned various kinds of power steering apparatus with they being controlled depending upon running conditions and running speed of a vehicle, magnitude of a steering force and magnitude of a steering at maneuvering. To realize this, various kinds of detector devices must be additionally provided.

Further, brawbacks with electric power steering apparatus of this kind are as follows. When an electric motor is employed, it is difficult to obtain operating characteristics conforming to a steering operation of a steering wheel due to inertia etc. of the motor. In addition, where there is a need to return a steering wheel steered to the original position, because of provision of a reduction gear mechanism between a steering shaft and the motor, it is required to detect a steering condition of a driver who attends to such an operation to rotate the motor in a reverse direction. Namely, where a steering road wheel is returned from swivelling condition to straight advancing condition in steering apparatus additionally provided with a power steering device, self-aligning torque (force applied so that a vehicle advances in a beeline when the vehicle being running) produced due to reaction force when the steering load wheel is in contact with ground is utilized. However, with the above-mentioned motor, friction is produced in its brush or the like, thus making the reverse rotation of a rotor insufficient. Accordingly, there arises a need of compensating for this insufficiency.

Htherto, detector devices of various design have been known as the above-mentioned detection mechanism. However, any one of them has drawbacks in structure or operating performance. This is serious e.g. in connection with a steering force detection mechanism to detect a steering request of a driver in respect to the steering wheel. Particularly, there arise various problems in respect of the detection method, the arrangement position of the structure and the detection performance etc.

For instance, a power steering apparatus additionally provided with a steering force detection mechanism of on/off type below the column shaft has been proposed. However, such a configuration allows the lower end of the shaft which is not enough from a view point of space for arrangement to be large, giving rise to complicated structure and troublesomeness in assembly work. In addition, because detector means of the contact type is employed, when repeatedly used, complicated adjustment work is required and a sufficient durability cannot be obtained. There has been also known another steering force detector mechanism provided with switching means of a contact strip at a portion joining the shaft of the steering wheel. However, even where such a detector mechanism is employed, because the switch is of the contact type, when repeatedly used, there arise problems in regard to the durability and the reliability in operation. This is serious when the last-mentioned detector mechanism is practically used. Further, torque sensors well known in the art have employed a strain gauge in most cases. However, such a detector means has difficulty in the reliability in respect to environment changes of e.g. temperature or humidity etc. and the reliability in respect to use over a long time. Therefore, such strain gauge type sensors are not practically acceptable. There are many problems when conventional mechanisms are practically used.

Accordingly, when embodying the electric power steering apparatus of this kind, it is required to properly detect the above-mentioned steering torque with a simple detector means to securely control a motor. Further, one problem occuring when embodying the above-mentioned electric power steering apparatus resides in the layout e.g. how the electric motor and the drive force transmission mechanism therefor are joined to the ordinary steering shaft. Namely, it is required to satisfy the following points. First is that the structure of the entirely of the apparatus is simple and manufacturing or assembling work etc. is easily carried out. Second is that the entirety of the apparatus is small and compact. Third is to adaptably incorporate the electric power steering apparatus into a vehicle.

Since the power steering apparatus of this kind is recently employed particularly in compact cars etc. limited in space, it is important to meet the abovementioned requirement.

However, on the other hand, the electric power steering apparatus which have been known in the art are all complicated in structure, failing to realize that the entirety of the apparatus is small and compact. Particularly, there arise problems when the power steering apparatus of this kind is actually incorporated into a vehicle.

For instance, an apparatus as described in the Japanese patent publicaion Tokkaisho No. 59-63264 etc. has been proposed wherein the apparatus is condigured to transmit a drive force from an electric motor to a portion of a steering shaft between a steering road wheel through a reduction gear mechanism. However, such a structure requires the provision of a body for the motor and the transmission system in additon to the ordinary steering gear body, with the result that the entirety of the apparatus becomes large, thus failing to satisfy the above requirement.

Further, an apparatus as shown in the Japanese patent publication Tokkaisho No. 57-134361 etc. has been also proposed wherein the above-mentioned electric motor and the transmission mechanism therefor are additionally provided in series at the side portion of the steering gear body to transmit a steering assistant force to an output shaft on the side of a steering road wheel joined to an input shaft on the side of a steering wheel through a torsion bar. Furthermore, an apparatus as shown in the Japanese patent publicaton Tokkaisho No. 57-47251 etc. has been proposed when he electric motor is directly joined to the extented end of the output shaft. However, these apparatus mentioned above cannot avoid that the entirety of the apparatus becomes large, and have the drawback that the structure becomes complicated. Therefore, it is strongly required to take any countermeasure.

SUMMARY OF THE INVENTION

With the above in mind, an object of the present invention is to provide an electric power steering apparatus of a simple and inexpensive structure, which makes it possible to prevent the reliability from being lowered even when it is used for a long time or environment changes occur to eliminate the troublesomeness in the adjustment work therefor.

Another object of the present invention is to provide an electric power steering apparatus which can properly and securely detect a steering force to provide a pertinent and smooth steering assistance effort conforming to the running conditions of a vehicle, this sufficiently exhibiting the apparatus performance.

To achieve these objects, there is provided an electric power steering apparatus comprising: steering shaft means including a torsion bar to join an input shaft on the side of a steering wheel to an output shaft on the side of a steering road wheel in a manner that they can be rotationally displaced relative to each other; sensor means of a non-contact type provided in association with the input and output shafts to sense a relative rotational displacement based on a torsion of the torsion bar; and electric motor means provided around a steering gear body within which the steering shaft means is disposed, the electric motor means being driven responding to a signal from the non-contact type sensor means to render a steering assistance to an output shafting leading to the steering road wheel. The non-contact type sensor means is used to serve as a displacement meter comprising in combination a Hall effect device and a magnet.

The electric motor has a motor shaft arranged in parallel with an axis direction of the input and output shafts. The motor shafts and an end portion extended in a direction opposite to said steering wheel on the output shaft through a steering gear are joined by a drive force transmission mechanism. Further, the steering gear body is formed with an annular cavity opened on the side of the input shaft. The cavity extends to the axial end of the output shaft joined through the torsion bar around the input and output shafts. The cavity is adapted to accommodate therewithin the non-contact type sensor means, a printed circuit board provided around the input shaft close to the non-contact type sensor means and having a circuit for processing a signal from the non-contact type sensor means, a slip ring for taking out an output signal provided in association with the input shaft, a signal take-out unit provided on the side of the steering gear body and having a wiper slidably in contact with the slip ring, and a lead wire outgoing toward the outside penetrating through a cap member closing the cavity within the steering gear body.

The input shaft may be provided with a first flange member to which the Hall effect device is secured and the output shaft may be provided with a second flange member for supporting the magnet thereon opposite to the first flange member in an axial direction. The slip ring may be provided on the input shaft so that it is radially opposite to the wiper. As an alternative form, the input shaft may be provided with a first flange member to which the Hall effect device is secured and the output shaft may be provided with a second flange member for supporting the magnet thereon and having a recessed portion, whereby the Hall effect device is positioned within the recessed portion of the second flange member. The slip ring may be provided on the printed circuit board so that it is axially opposite to the wiper of the signal take-out unit.

The above-mentioned non-contact type sensor means may be formed as a gap sensor. Preferably, two sets of the displacement meters may be used as the non-contact type sensor means so that one serves as a fail-safe circuit with respect to the other. It is also preferable to constitute the electric motor means so that it further responds to various running conditions from a vehicle speed sensor etc. in addition to a steering torque represented by the signal from the non-contact type sensor means.

Thus, the present invention makes it possible to easily and properly sense a relative rotational displacement between input and output shafts joined by the torsion bar with the non-contact type sensor e.g. a Hall effect device etc. to drivingly control the electric motor in a pertinent manner, and to simplify the whole structure to attain small-size and low cost etc.

BRIEF DESCRIPTION OF THE DRAWINGS

The features and advantages of an electric power steering apparatus according to the present invention will become more apparent from the following description taken in conjunction with the accompanying drawings in which.

DETAILED DESCRIPTION OF PREFERRED EMBODIMENTS

Initially, a first embodiment of an electric power steering apparatus according to the present invention will be described.

Figure 1:
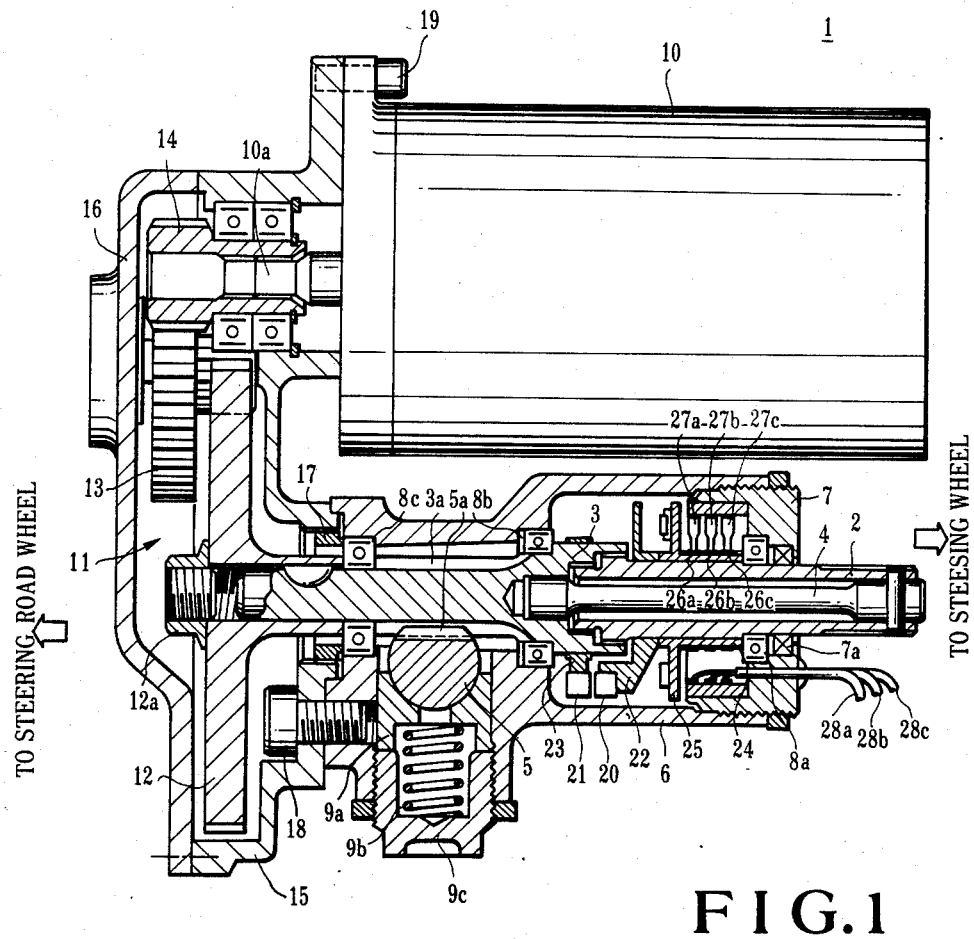
FIG. 1 is a side elevational cross section skematically illustrating an embodiment of an electric power steering apparatus according to the present invention.
Figure 2:
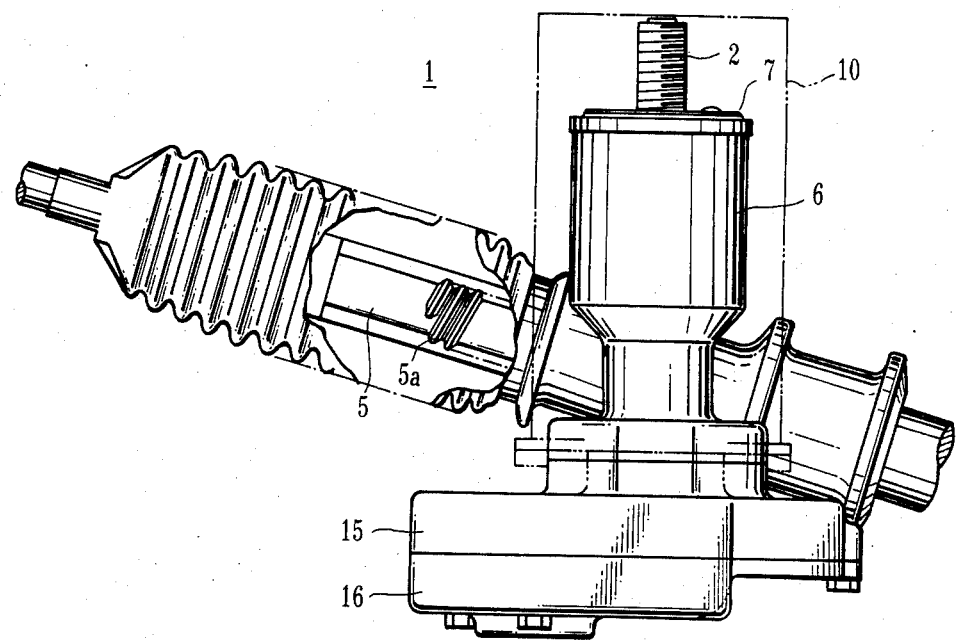
FIG. 2 is a plan view illustrating the essential part of the electric power steering apparatus shown in FIG. 1.

An electric power steering apparatus of which entirety is denoted by reference numeral 1 includes a steering shaft comprising a stub shaft 2 joined to the side of a steering wheel (not shown) to serve as an input shaft, a pinion shaft 3 having a pinion 3a joined to a steering road wheel (not shown) to serve as an output shaft, and a torsion bar 4 joining the both shafts 2 and 3 so that they are rotationally displaced relative to each other within a predetermined angular range. These shafts 2 and 3 etc. constituting the steering shaft is disposed within a steering gear body 6 so that it penetrates therethrough along with a rack 5 having a rack tooth 5a meshing with the pinion 3a. A body cap member 7 is provided for closing the opening end of the steering gear body 6. Bearings 8a, 8b and 8c are provided for rotatably supporting the shafts 2 and 3 within the above-mentioned body 6. A dust seal 7a is provided for closing an axial hole portion formed in the cap member 7. Further, the above-mentioned rack 5 constitutes a steering link mechanism joining steering road wheels to each other together with a pitman arm and a tie rod etc. In FIG. 1, parts denoted by reference numerals 9a, 9b and 9c corresponding to mesh portions between the rack tooth 5a and the pinion 3a serve as a rack pad supporting the lower portion of the rack 5, a spring and a cap member, respectively.

Figure 3:
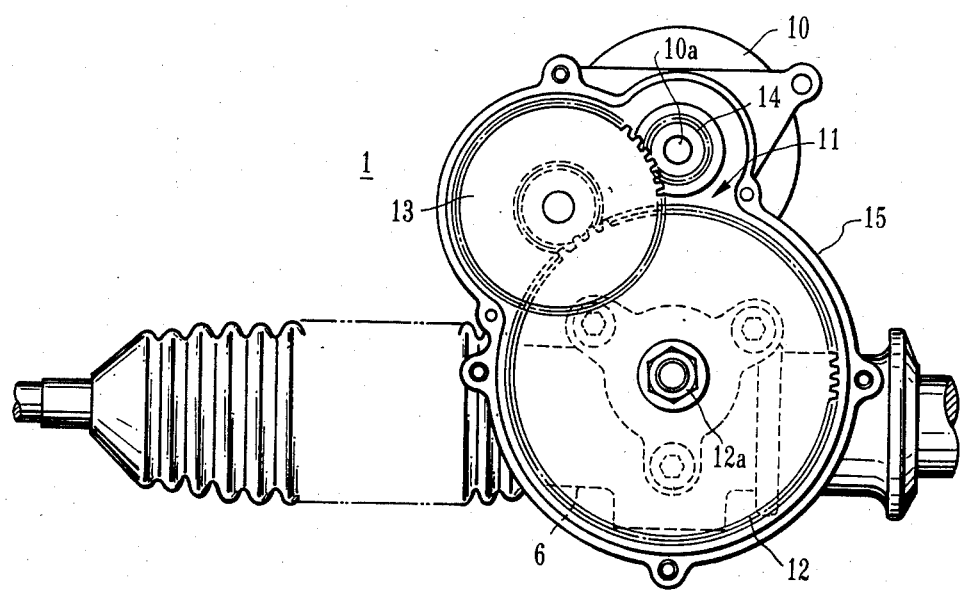
FIG. 3 is a front view illustrating the essential part of the electric power steering apparatus shown in FIG. 1, FIGS. 4A and 4B are perspective view skematically illustrating the arrangement of a non-contact sensor and a member opposite thereto employed in the present invention.

On the other hand, at an end portion opposite to the steering wheel through the rack 5 on the pinion shaft 3 constituting the steering shaft, there is provided a large tooth wheel 12 constituting a reduction gear mechanism 11 to reduce a rotational drive force from an electric motor 10 to transmit it. Namely, in this embodiment, the electric motor 10 generating a steering assistance effort is disposed around the steering gear body 6 substantially in parallel with the steering shafts (2, 3 and 4) disposed within the steering gear body 6. Further, a motor output shaft 10a and the pinion shaft 3 constituting the steering shaft are joined to each other by means of three tooth wheels 12, 13 and 14 of different radii, thus to reduce a rotation of the motor 10 to a predetermined number of rotation to transmit it to the pinion shaft 3 constituting the output shafting to the side of the steering road wheel. A gear box body 15 is integrally joined to the steering gear body 6 and is adapted to fix the motor 10 on the other side thereof. A gear box cover 16 is additionally fitted to the opening portion of the gear box body 15. FIG. 3 shows the condition where the cover 16 is removed. A fixed ring 17 is provided for fixing the bearing 8c supporting the pinion shaft 3. A screw 18 is provided for joining the box body 15 to the steering gear body 6 to fix it thereto. A screw 19 is provied for fixing the motor 10 to the box body 10. Further, the above-mentioned intermediate tooth wheel 13 is axially supported on the side of the cover 16 and is formed with a tooth wheel with step portions having large and small tooth wheel portions in this example. A nut 12a is provided for screw-threadedly fastening the large tooth wheel 12 on the top portion of the pinion shaft 3. The nut 12a also functions to clamp and fix the bearing 8c for supporting the pinion shaft 3 through the large tooth wheel 12.

The above-mentioned arrangement of respective constituent members makes it possible to efficiently join the steering gear body 6 having the above-mentioned steering shaft and the steering gear portion etc., the electric motor 10 and the gear box (15) within which the reduction tooth wheel mechanism 11 is provided and the like, with the result that the entirety of the power steering apparatus 1 can be small-sized and compact, thus providing excellent advantages in practical use. Particularly, the above-mentioned configuration makes it possible to arrange the electric motor 10 into a portion which ordinarily can be considered as a dead space when assembled into a vehicle body around the steering shaft (2 and 3) joined by the torsion bar 4. Further, such a configuration is such that the motor shaft 10a is joined to the end portion of the pinion shaft 3 on the output side opposite to the steering wheel which is enough from a viewpoint of space through the reduction gear mechanism 11, thus providing excellent layout when the power steering apparatus of this kind is actually incorporated in a vehicle. Particularly, minicars of the FF (front engine, front drive) type and the like which have been remarkably put into practice in recent years have little space in front of the steering gear body 6, but have a space above the steering gear body 6 in most cases. Accordingly, by additionally providing the motor 10 at the portion above the steering gear body 6, it is possible to provide an excellent advantage when actually mounted on a vehicle.

According to the present invention, the electric power steering apparatus thus configured is characterized in that a Hall element 20 known as a Hall effect device and a magnet 21 opposite thereto are provided as a non-contact type sensor to sense a relative rotational displacement due to torsion of the torsion bar 4 between the stub shaft 2 on the side of the steering wheel and the pinion shaft 3 on the side of the steerig road wheel which are joined so that they can be rotatably displaced relative to each other by the torsion bar 4, thus to respond to a signal from a displacement meter constituted with the Hall element 20 to drive the electric motor 10 which renders a steering assistance effort to a part (the pinion shaft 3) of the output shafting leading to the steering road wheel.

Figure 4A:
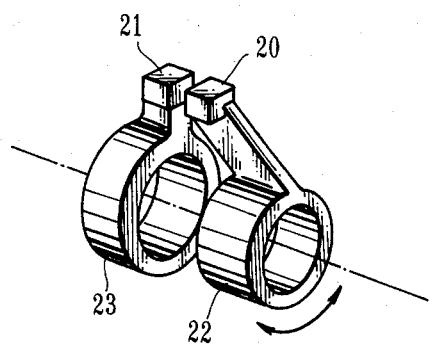

Namely, in accordance with the present invention, at the end portions of the shafts 2 and 3 on the input and output sides joined by the torsion bar 4 within the steering gear body 6, flange members 22 and 23 are provided, respectively, as shown in FIG. 4A. Further, the Hall element 20 is provided at the flange member 22 of the shaft 2 on the input side and the magnet 21 is provided at the flange member 23 on the output side so that it is opposite to the Hall element 20 in a direction of the axis, thus to sense a rotational displacement between the both shafts 2 and 3. It is well known that this rotational displacement corresponds to a relative displacement within a predetermined angular range based on a fail-safe mechanism provided between the both shafts 2 and 3.

The configuration stated above can simply and properly sense a steering torque in a predetermined direction applied to the steering wheel, and efficiently assemble the displacement meter as the displacement sensor unit into the steering gear body 6, thus providing excellent advantage in the attainment of miniaturization of the entirety of the apparatus. In this instance, the returning operation of the steering wheel based on the steering operation can be carried out with the motor 10 controlled by a relative rotational displacement between the pinion shaft 3 on the output side and the stub shaft 2 on the input side which are displaced by a self-aligning torque transmitted from the steering road wheel Such a displacement meter consititued with a non-contact type sensor e.g. the Hall element 20 etc. makes it possible to properly and securely sense the displacement even if the amount of torsion of the torsion bar 4 is small as compared to the oil pressure type power steering apparatus.

In the above-mentioned embodiment, a tubular body 24 is provided around the stub shaft 2 within the steering gear body 6 with it being close to the displacement meter constituted with the above-mentioned Hall element 20. A ring-shaped flange projected from a part of the tubular body 24 is used as a printed circuit board 25 for an amplifier on which various electronic parts are mounted to process a signal from the Hall element 20. Along the outer peripheral portion of the tubular body 24, slip rings 26a, 26b and 26c are provided. The printed circuit board 25 is connected to a controller (not shown) provided outside through wipers 27a, 27b and 27c which are slidably in contact with the slip rings or brushes 26a, 26b and 26c and lead wires 28a, 28b and 28c. With the configuration stated above, an output of a sense signal from the side of the steering shaft (2) rotating in cooperation with the steering operation is simply and properly carried out by using the slip ring (26) and the wiper (27) etc. Further, the displacement meter constituted with the above-mentioned Hall element 20 etc., an amplifier for processing a sense signal from the Hall element, the signal output unit constituted with the wiper 27 for outputting a signal and the like are assembled into the steering gear body 6. The opening portion of the steering gear body 6 is closed by the cap member 7 having the dust seal 7a etc. Accordingly, this makes it possible to arrange the above-mentioned members within the seal-in space in a manner that it is screened with respect to the outside, thus preventing bad contact etc. due to dust etc. With the configuration stated above, respective constituent members to be needed are assembled into the space formed within the steering gear body 6 through the opening portion closed by the cap member 7, thus advantageously providing excellent assembling ability.

Figure 4B:
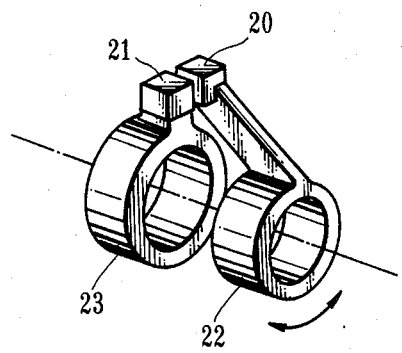

In the above-mentioned embodiment, the Hall element 20 and the magnet 21 are provided oppositely to each other in a direction of axis as a non-contact type sensor for sensing displacement between the shafts 2 and 3 joined through the torsion bar 4. In addition, as shown in FIG. 4B, there may be employed an arrangement such that the Hall element 20 and the magnet 21 are opposite to each other in a circumferential direction. Further, it is readily understood that the similar advantages can be obtained by using a non-contact type sensor e.g. a gap sensor etc.

The sense signal given by the Hall element 20 employed as the above-mentioned non-contact type sensor has a complementary characteristic such that a value of current increases or decreases depending upon the steering operation in a left- or right-hand direction when the neutral position of the steering wheel is set at a predetermined value, thus making it possible to sense that the steering wheel is steered in the left- or right-hand direction.

The sensor unit stated above can sense a rotational displacement at the portion joined by the torsion bar 4 of the steering shaft which is caused by the steering operation with the Hall element 20 etc. as the non-contact type sensor, thus to recognize a steering torque. Accordingly, because the sensor unit has a simplified construction and of the non-contact type structure, when employed as sensor means for the object frequently and repeatedly used for a long time as in the case of the steering wheel of this kind, such a sensor structure can sufficiently exhibit the advantage. Further, the non-contact type sensor e.g. the above-mentioned Hall element 20 etc. has high reliability in respect to environment changes e.g. temperature or himidity etc., and has no need to frequently effect balance adjustment as in the prior art, with the result that its maintenance is easy.

Figure 5:
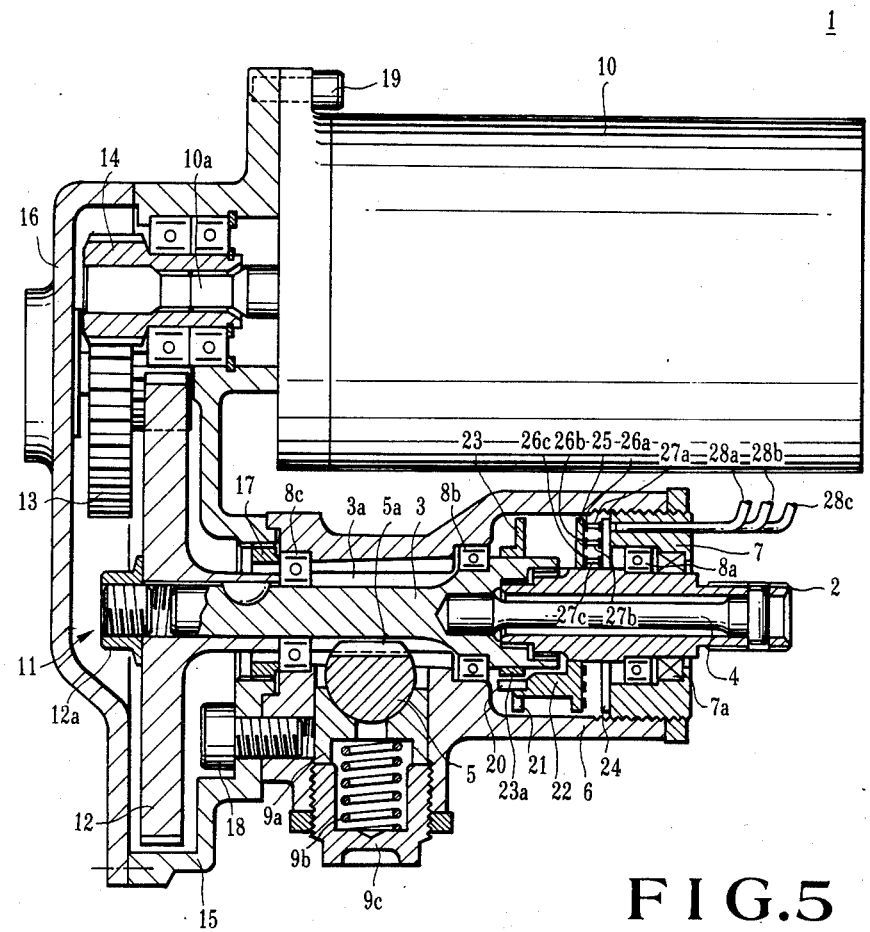
FIG. 5 is a side elevational cross section skematically illustrating another embodiment of an electric power steering apparatus according to the present invention.

Referring to FIG. 5, there is shown another embodiment of the present invention. In this embodiment, an output of a sense signal obtained utilizing the wiper (27) is carried out by using slip rings 26a, 26b and 26c formed along the circumferential direction of the side surface of the printed circuit board 25 and wipers 27a, 7b and 27c provided opposite thereto. In this example, the Hall element 20 as the non-contact type sensor is positioned within a recessed portion 23a formed at a part of the flange member 23 on the opposite side. It is appreciated that not only the same advantages as those with the above-mentioned embodiment but also an advantage to realize a shortened length in a direction of axis of the steering gear body 6 can be obtained.

The present invention is not limited to the structure of the above-mentioned embodiments. The shape or structure etc. of the respective portions may be suitably modified or changed according to need. In the above-mentioned embodiments, it has been described that a displacement sensor unit configured with a non-contact type sensor is constituted with a displacement meter comprised of one set of the Hall element 20 and the magnet 21. However, the present invention is not limited to the above-mentioned displacement sensor unit. It is needless to say that two sets of displacement meters are provided in parallel therewith, thus allowing one of the displacement meters to function as a safty circuit. In the above-mentioned embodiments, it has been described that the control of the motor 10 is carried out on the basis of a steering torque. In addition, it is needless to say that an operation may be conducted to input various running conditions from a vehicle speed sensor etc. as well as the above-mentioned steering torque to a controller, thus suitably drivingly control the motor with an output signal from the controller.

In the above-mentioned embodiment, it has been also described that the reduction gear mechanism 11 is constituted with three tooth wheels. However, without limitting to such a structure, there may be employed a reduction gear mechanism which can be driven at a low current wherein the reduction mechanism may be driven by an electric motor having a large torque with one-to-one relationship. In addition, the transmission means is not limited to the above-mentioned gear mechanism, but may be constituted e.g. by using belt, or a chain etc.

In the above-mentioned embodiment, it has been described that the steering gear of the rack and pinion type is used. It is readily understood that the present invention is not limited to the above-mentioned steering gear, but is applicable to a steering gear of the ball and screw type, thus providing the same advantages.

As described above, the electric power steering apparatus according to the present invention is configured so as to provide a non-contact type sensor to sense a relative rotational displacement based on torsion of the torsion bar between the input shaft on the side of the steering wheel and the output shaft on the side of the steering road wheel joined so that they can be rotatably displaced relative to each other by the torsion bar, and to provide an electric motor driven in response to a signal from the non-contact type sensor to render a steering assistance effort to the output shafting leading to the steering load wheel. Accordingly, although the electric power steering apparatus according to the present invention is of simple and inexpensive structure, it can be free form lowering of reliability in regard to long use or environment changes and troublesomeness of the adjustment work therefor encountered with a torque sensor of on/off type of strain gauge torque type which have been commonly used in the prior art, and properly and securely sense a steering force, thereby providing a proper and smooth steering assistance effort conforming to running conditions of a vehicle, thus sufficiently exhibiting the performance of the apparatus. Further, the apparatus according to the present invention is of quite simple construction, thus making it possible to realize miniaturization of the entirety of the apparatus and low cost thereof, and to provide excellent advantage when actually mounted on a vehicle.

What is claimed is:

1. An electric power steering apparatus comprising:
    (a) steering shaft means including a torsion bar to join an input shaft on the side of a steeing wheel and an output shaft on the side of a steering road wheel in a manner that they can be rotationally displaced relative to each other,
    (b) sensor means of a non-contact type provided in association with said input and output shafts to sense a relative rotational displacement based on a torsion of said torsion bar, and
    (c) electic motor means provided around a steeing gear body within which said steering shaft means is disposed, said electic motor means being driven responding to a signal from said non-contact type sensor means to render a steering assistance to an output shafting leading to said steering road wheel, wherein said steering gear body is formed with an annular cavity opened on the side of said input shaft, said cavity extending to the axial end of said output shaft joined through said torsion bar around said input and output shafts, said cavity being adapted to accommodate therewithin said non-contact type sensor means, a printed circuitboard provided around said input shaft close to said non-contact type sensor means and having a circuit for processing a signal from said non-contact type sensor means, a slip ring for taking out an output signal provided in association with said input shaft, a signal take-out unit provided on the side of said steering gear body and having a wiper slidably in contact with said slip ring, and a lead wire outgoing toward the outside penetrating through a cap member closing said cavity within said steering gear body.

2. An electric power steering apparatus as set forth in claim 1, wherein said non-contact type sensor means comprises in combination a Hall effect device and a magnet, said input shaft being provided with a first flange member to which said Hall effect device is secured, said output shaft being provided with a second flange member for supporting said magnet thereon opposite to said first flange member in an axial direction.

3. An electric power steering apparatus as set forth in claim 1 or 2, wherein said slip ring is provided on said input shaft so that it is radially opposite to said wiper.

4. An electric power steering apparatus as set forth in claim 1, wherein said non-contact type sensor means comprises in combination a Hall effect device and a magnet, said input shaft being provided with a first flange member to which said Hall effect device is secured, said output shaft being provided with a second flange member for supporting said magnet thereon and having a recessed portion, said Hall effect device being positioned within said recessed portion of said second flange member.

5. An electric power steering apparatus as set forth in claim 1 wherein said slip ring is provided on said printed circuit board so that it is axially opposite to said wiper of said signal take-out unit.

* * * * *